United States Patent
Palm et al.

(10) Patent No.: US 12,100,324 B2
(45) Date of Patent: Sep. 24, 2024

(54) HEAD-UP DISPLAY WITH DISPLAY APPARATUS

(71) Applicant: Continental Automotive GmbH, Hannover (DE)

(72) Inventors: Nils Palm, Babenhausen (DE); Sebastian Schlupp, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/741,963

(22) Filed: May 11, 2022

(65) Prior Publication Data

US 2022/0366818 A1 Nov. 17, 2022

(30) Foreign Application Priority Data

May 12, 2021 (EP) ..................................... 21465519

(51) Int. Cl.
*G06F 3/038* (2013.01)
*G02B 27/01* (2006.01)
*G09G 3/00* (2006.01)

(52) U.S. Cl.
CPC ......... *G09G 3/001* (2013.01); *G02B 27/0101* (2013.01); *G02B 2027/0118* (2013.01); *G02B 2027/014* (2013.01); *G09G 2320/0626* (2013.01); *G09G 2360/145* (2013.01); *G09G 2360/16* (2013.01)

(58) Field of Classification Search
CPC ................ G09G 3/001; G02B 27/0101; G02B 2027/0118; G02B 2027/014
USPC ........................................................ 345/207
See application file for complete search history.

(56) References Cited

U.S. PATENT DOCUMENTS

| | | | |
|---|---|---|---|
| 8,681,073 B1 | 3/2014 | Robbins et al. | |
| 2016/0284272 A1* | 9/2016 | Her | G09G 3/035 |
| 2017/0176744 A1* | 6/2017 | El-Ghoroury | G02B 27/1066 |
| 2019/0162958 A1 | 5/2019 | Kobashigawa et al. | |
| 2019/0206324 A1* | 7/2019 | Kim | G09G 3/3241 |
| 2019/0361233 A1 | 11/2019 | Ogawa | |
| 2020/0005731 A1 | 1/2020 | Yang et al. | |

(Continued)

FOREIGN PATENT DOCUMENTS

DE 102015215180 A1 2/2017
DE 102016105146 A1 9/2017

(Continued)

OTHER PUBLICATIONS

Office action dated Jan. 19, 2022 from corresponding German patent application No. 10 2021 204 928.1.

(Continued)

*Primary Examiner* — Jonathan M Blancha

(57) ABSTRACT

A head-up display having a display apparatus comprising a picture generating unit comprising a display element for displaying an image and a driver for the display element, an optical unit for projecting the image onto a projection surface, and an image control unit for controlling the display element via the driver. The picture generating unit further comprises an image brightness monitoring device, which has an image signal input connected to an image signal output of the image control unit and has a signal output connected to a signal input of the display element.

5 Claims, 3 Drawing Sheets

(56) References Cited

U.S. PATENT DOCUMENTS

2020/0201035 A1* 6/2020 Anand ................. G06V 10/993
2021/0114461 A1* 4/2021 O'Connell ............. G08G 1/166

FOREIGN PATENT DOCUMENTS

DE     112017007019 T5   10/2019
JP        6784058 B2   11/2020

OTHER PUBLICATIONS

Search Report dated Oct. 14, 2022 from corresponding European patent application No. 22170946.2.

* cited by examiner

HEAD-UP DISPLAY WITH DISPLAY APPARATUS

CROSS REFERENCE TO RELATED APPLICATIONS

This U.S. patent application claims the benefit of European patent application EP21465519.3, filed May 12, 2021, which is hereby incorporated by reference.

TECHNICAL FIELD

The present disclosure relates to a head-up display with a display apparatus having a picture generating unit with a display element for displaying an image and an optical unit for projecting the image onto a projection surface.

BACKGROUND

Head-up displays can be used, for example, for a means of transport. A head-up display, also referred to as a HUD, is understood to mean a display system in which the viewer can maintain their viewing direction, since the contents to be represented are superposed into their visual field. While such systems were originally primarily used in the aerospace sector due to their complexity and costs, they are now also being used in large-scale production in the automotive sector.

Head-up displays generally comprise a picture generating unit (PGU), an optical unit, and a mirror unit. The picture generating unit generates the image and for this purpose uses at least one display element. The optical unit directs the image onto the mirror unit. The mirror unit is a partially reflective, light-transmissive pane. The viewer thus sees the contents represented by the picture generating unit as a virtual image and at the same time sees the real world behind the pane. In the automotive sector, the windshield, whose curved shape generally needs to be taken into consideration in the representation, is often used as the mirror unit. Due to the interaction of the optical unit and the mirror unit, the virtual image is an enlarged representation of the image produced by the picture generating unit. The picture generating unit and the optical unit are generally delimited with respect to the environment by a housing having a transparent cover.

A liquid crystal display (LCD) with a backlight is typically used for the picture generating unit in head-up displays. Display devices based on OLED (organic light-emitting diode) technology and DMD (digital micromirror device) technology are also used.

DE 10 2015 215 180 A1 describes a head-up display for a vehicle. The head-up display comprises a display apparatus for emitting light with an image generating unit, and an image control unit for controlling the image generating unit. A reduced brightness is set in regions of the display apparatus in dependence on the viewing direction of a user. This makes it possible to reduce the energy expenditure during image generation. However, it does not prevent the user being dazzled if the ambient brightness is low and the regions of the display apparatus that are not reduced in terms of their brightness being set to be too bright, or a signal interference occurring. A head-up display that is improved in comparison therewith is desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect, a head-up display with a display apparatus comprises a picture generating unit comprising a display element for displaying an image and a driver for the display element, an optical unit for projecting the image onto a projection surface, and an image control unit for controlling the picture generating unit via the driver thereof. The picture generating unit further comprises an image brightness monitoring device, which has an image signal input connected to an image signal output of the image control unit and has a signal output connected to an input of the display element.

The image brightness is monitored so closely to the location of the image generation that there is nearly no possibility that interferences that can cause excessive image brightness still occur after the monitoring. As a result, the safety for a user of the head-up display is increased. Complicated measures for shielding a signal line between the image control unit and the display element are not required. The connections of the image brightness monitoring device to the image control unit or the display element can be implemented either directly or via one or more interconnected elements. Signal interferences can never be entirely ruled out for example in the automotive sector with a continuous increase of electronics over a continuously decreasing space. Therefore, error monitoring and a reaction thereto make sense. Due to the error monitoring placed according to the disclosure at the far end of the signal path, the remaining risk of any interference still occurring after the error monitoring is minimized. The image brightness perceived by the user may be influenced by way of various measures. If the display element is based on LCD technology or another technology in which the display element is lit from behind, the transparency thereof is influenced. If the display element is based on OLED technology or another technology in which the display element is self-illuminating, the luminosity thereof is influenced. In reflective display elements, for example based on DMD technology, the reflectivity thereof is correspondingly influenced.

According to an embodiment, the image brightness monitoring device is arranged between the image control unit and the driver. The image brightness monitoring device is here arranged for example in the picture generating unit or on the display element. The signal lines between the image brightness monitoring device and the driver may be shielded via an interference signal shield of the picture generating unit, for example the metal housing thereof or a shield of a different type.

According to an embodiment, the image brightness monitoring device is likewise arranged between the driver and the display element. The image brightness monitoring device is arranged even closer to the display element, as a result of which the likelihood of interfering signals is further reduced. In this case, there is no need for a special interference signal shield of the picture generating unit if a corresponding shield of the driver or of the display element is used herefor, too.

According to an embodiment, the image brightness monitoring device and the driver are implemented in a common component. For example, the image brightness monitoring device is integrated into a driver IC, or separate units of the image brightness monitoring device and the driver are pre-mounted on a single component, similar to the concept of "system-on-chip." Only a single component needs to be mounted and only a single interference signal shield is required for this component.

According to one embodiment, the image brightness monitoring device is configured to sum the brightness of the image points, which have been transmitted thereto via an input signal, for an image to be represented within a specific time period and, if in doing so a limit value is exceeded, to reduce the brightness of the image points. The reducing may involve a complete switch-off. The image brightness monitoring device may have a simple construction and consequently react quickly to an imminent dazzling of the user, since only a small number of processing steps are required. In this case, the brightness is already reduced before any disturbing dazzling of the user can occur.

Reducing by a fixed value is likewise advantageous. For example, if it is known that 25% of the maximum brightness does not cause any disturbing dazzling of the user, the brightness of all image points is then reduced to 25% of its current value. A visible image continues to be available for the user, albeit with a reduced brightness. Nevertheless, the user is not completely cut off from the image information, but is simultaneously protected against being dazzled.

According to one embodiment, the image brightness monitoring device is configured to reduce image points of a first group of image points in terms of their brightness more strongly than image points of a second group. The image point groups are here selected such that the second group contains particularly safety-critical information which should definitely be visible to the user, and the first group contains information that are less critical with regard to the driving safety. This increases the driving safety, both by avoiding the user being dazzled and also by making available safety-critical information for the user. A greater reduction can here likewise range all the way to the complete switch-off of an image point.

According to one embodiment, the image brightness monitoring device has an error signal output connected to an error signal input of the image control unit. This has the advantage of feedback to the image control unit. The latter may reduce—possibly after a latency period—the brightness values of the output signal thereof. The image brightness monitoring device has no need for its own signal processing for the image signal to be represented, but may be designed specifically for the monitoring of the image signal and the outputting of an error signal. This reduces the complexity, increases the reliability, and simplifies the implementation.

BRIEF DESCRIPTION OF THE DRAWINGS

The present disclosure will become more fully understood from the detailed description and the accompanying drawings, wherein.

DETAILED DESCRIPTION

For a better understanding of the principles of the present disclosure, embodiments of the disclosure will be explained in more detail below with reference to the Figures. The same reference signs will be used in the Figures for identical or functionally identical elements and are not necessarily described again for each Figure. It is to be understood that the disclosure is not restricted to the illustrated embodiments and that the features described can also be combined or modified without departing from the scope of protection of the invention as defined in the appended claims.

Figure 1:
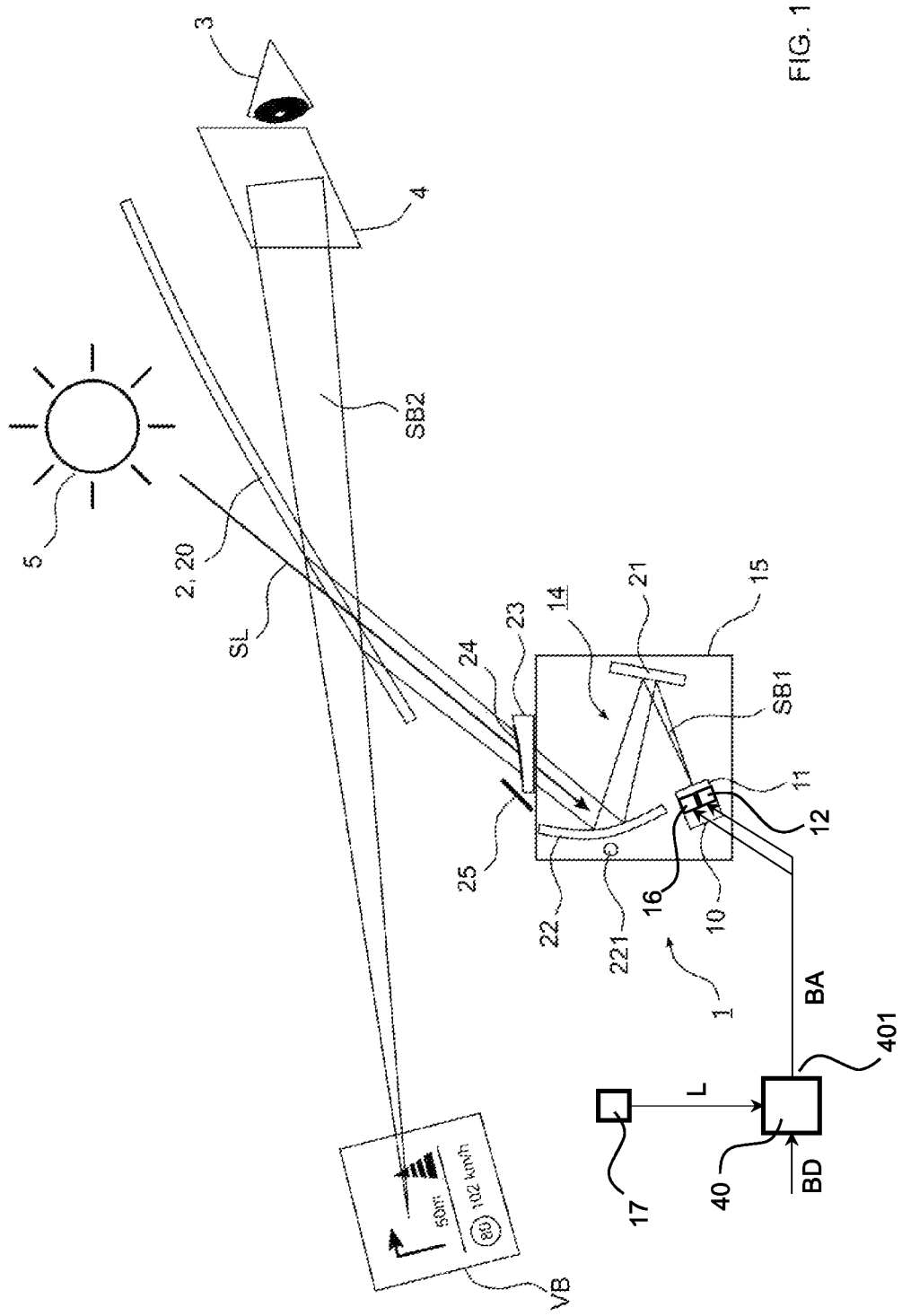
FIG. 1 schematically shows a head-up display with a display apparatus according to the disclosure.

FIG. 1 schematically shows a head-up display with a display apparatus according to the disclosure. The head-up display has a display apparatus 1 with a picture generating unit 10 and an optical unit 14. A beam SB1 emanates from a display element 11 and is reflected by a folding mirror 21 onto a curved mirror 22 that reflects it in the direction of a mirror unit 2. The mirror unit 2 is illustrated here as a windshield 20 of the motor vehicle. From there, the beam SB2 travels in the direction of an eye of a viewer 3.

The user 3 sees a virtual image VB that is located outside the motor vehicle above the engine hood or even in front of the motor vehicle. Due to the interaction of the optical unit 14 and the mirror unit 2, the virtual image VB is an enlarged representation of the image displayed by the display element 11. A speed limit, the current vehicle speed, and navigation instructions are symbolically represented here. As long as the eye of the user 3 is located within an eyebox 4, indicated by a rectangle, all elements of the virtual image VB are visible to the user 3. If the eye of the user 3 is outside the eyebox 4, the virtual image VB is only partially visible to the user 3 or not at all. The larger the eyebox 4 is, the less restricted the user is when choosing their seating position.

The curvature of the curved mirror 22 is adapted to the curvature of the windshield 20 and ensures that the image distortion is stable over the entire eyebox 4. The curved mirror 22 is rotatably mounted by a bearing 221. The rotation of the curved mirror 22 that is made possible thereby makes it possible to displace the eyebox 4 and thus to adapt the position of the eyebox 4 to the position of the user 3. The folding mirror 21 serves to ensure that the path travelled by the beam SB1 between the display element 11 and the curved mirror 22 is long and, at the same time, that the optical unit 14 is nevertheless compact. The picture generating unit 10 and the optical unit 14 are delimited with respect to the environment by a housing 15 having a transparent cover 23. The optical elements of the optical unit 14 are thus protected for example against dust located in the interior of the vehicle. An optical film or a polarizer 24 is furthermore located on the cover 23. The display element 11 is typically polarized, and the mirror unit 2 acts like an analyzer. The purpose of the polarizer 24 is therefore to influence the polarization in order to achieve uniform visibility of the useful light. An anti-glare protection 25 serves to reliably absorb the light reflected via the interface of the cover 23 so that the user is not dazzled. In addition to the sunlight SL, the light from another stray light source 5 may also reach the display element 11. In combination with a polarization filter, the polarizer 24 can additionally also be used to reduce incident sunlight SL.

Further dazzling of the user may occur if the virtual image VB generated by the display element 11 is much brighter than the ambient brightness. In that case, the eye of the user has adjusted to a low brightness and is dazzled by the virtual image VB if the latter has not been adapted. For this purpose, a light sensor 17 is provided, which captures the ambient brightness and supplies a corresponding signal to the image control unit 40. The latter then adapts the brightness values of the image points of an image BD to be represented and outputs an adapted image signal BA at its image signal output 401. Said image signal BA is supplied to a driver 12 controlling the display element 11. In addition, the image signal BA is supplied to an image brightness monitoring device 16. The latter monitors whether the image brightness is too high and initiates a suitable reaction. In the simplest case, this reaction consists of switching off the display element 11 so that it does not emit light, no matter what image signal BA is present. A malfunction of the light sensor 17 or of the image control unit and any occurring changes in the brightness value of the image points of the image signal BA on signal transmission paths do not result in the user being dazzled.

Figure 2:
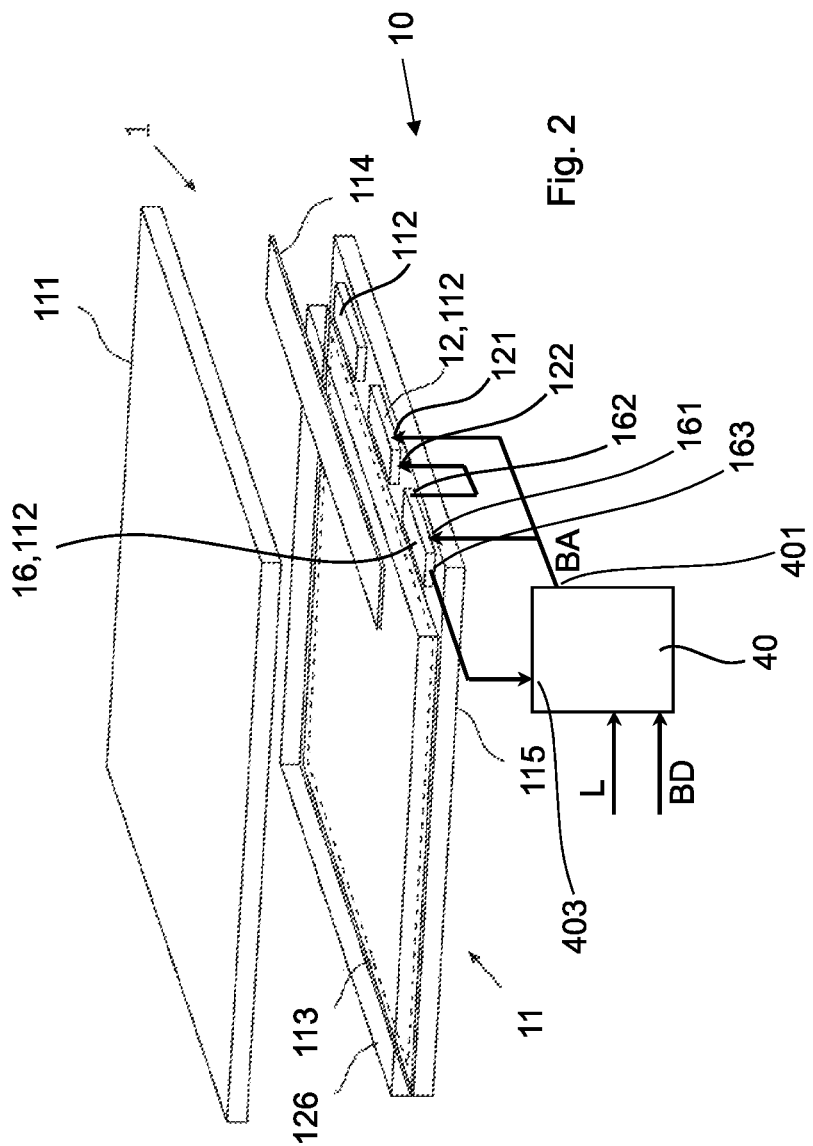
FIG. 2 shows a perspective illustration of an embodiment of a display apparatus.

FIG. 2 shows a perspective illustration of an embodiment of a display apparatus 1 of a head-up display according to the invention with a plurality of electronic components 112, of which at least one is a driver 12. A thermally conductive element 114 is arranged above the electronic components 112. A perspective exploded drawing of the display apparatus 1 is illustrated. In one embodiment, the electronic components 112 are the image brightness monitoring device 16, a driver 12 for the display element 11, and a further component 112, all three of which are arranged on a substrate 115 of the display element 11 in a manner adjoining an active surface 113, which is illustrated here by dashes. A cover 126, the design and function of which depends on the type of the display unit, is disposed on the active surface 113. In the case of a liquid crystal display, the cover 126 is, for example, a color filter glass, and in the case of an OLED display, by contrast, it is a cover glass required for encapsulation. The active surface 113 is typically slightly smaller than the cover 126. A cover glass 111 is provided above the display element 11. The thermally conductive element 114 here extends over the entire width of the display element 11 and consequently over all three components 112. Owing to the two-dimensional placement of a thermally conductive element 114 made of a suitable material with a high thermal conductivity value, the heat developed by the components 112 is distributed uniformly and the temperature thereat is reduced.

Shown at the image control unit 40 is the image signal output 401, from which an image signal BA of the image to be displayed reaches both an image signal input 161 of the image brightness monitoring device 16 and also an image signal input 121 of the driver 12. The image brightness monitoring device 16 checks the image signal BA as to whether it has excessive brightness. If this is the case, a corresponding signal is output via a signal output 162 to a signal input 122 of the driver 12. In the simplest case, this is an error signal FS, which indicates the presence of an error. The driver 12 then switches the entire display element 11 to "black," or it reduces the brightness of the entire display element 11 to a specified fraction of the brightness of the image points contained in the image signal BA, or it initiates another suitable measure. According to one embodiment, the image brightness monitoring device 16 already provides a signal instructing the driver 12 as to what type of reaction to the ascertained excessive brightness is to take place. The instruction may, for example, consist of specifying a fraction by which the brightness of all image points should be reduced. The instruction may also consist of specifying a specific group of image points whose brightness should be reduced. This group may for example be a peripheral region, in which typically less safety-relevant information is displayed than in a central region.

According to an embodiment, the image brightness monitoring device 16 outputs a signal via an error signal output 163 to an error signal input 403 of the image control unit 40. The latter may then react appropriately thereto, for example by ignoring the light sensor signal L of the light sensor 17 and reducing the brightness of the image points of the image signal BA to be displayed, which it has emitted, until there is no longer an error signal present at its error signal input 403. In an embodiment, the image brightness monitoring device 16 is arranged between the image control unit 40 and the driver 12. It may also be integrated into the driver 12 or be arranged between the driver 12 and the display element 11 (not shown here).

Figure 3:
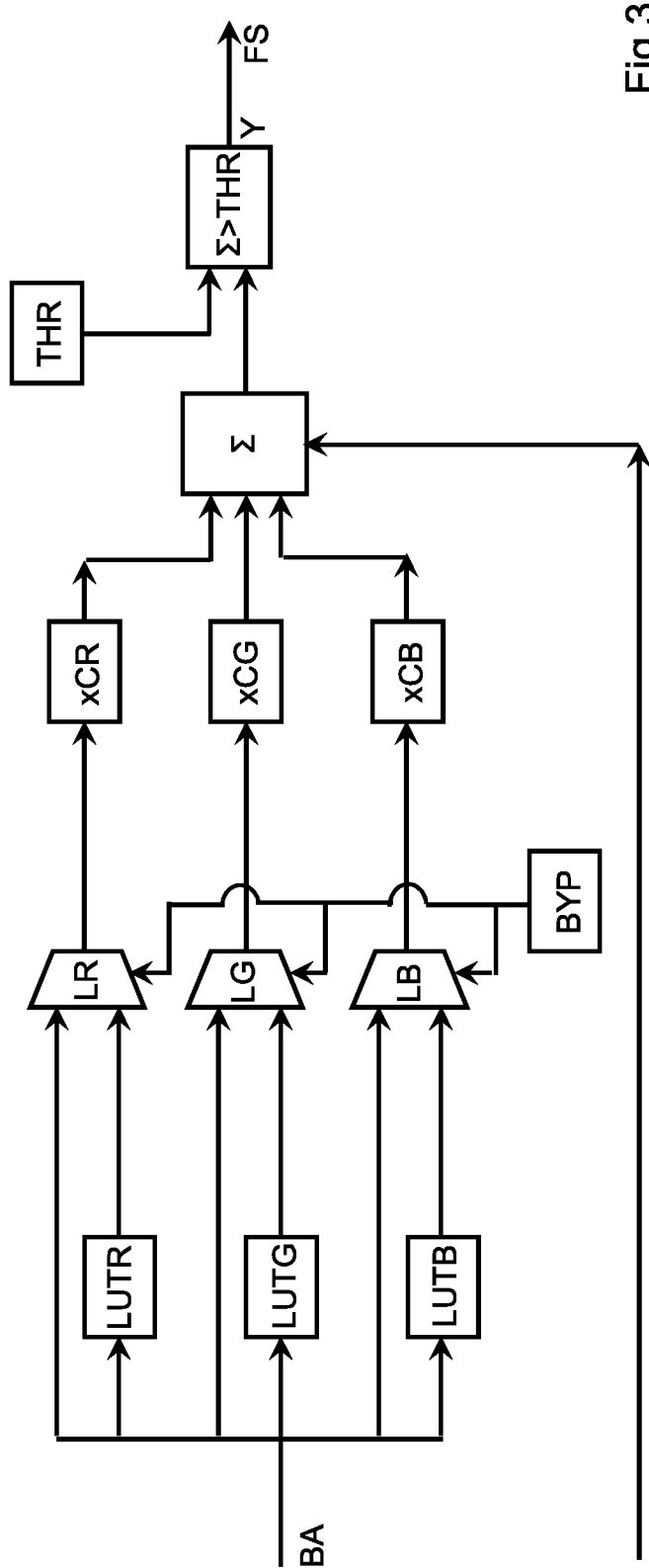
FIG. 3 shows a function diagram of an image brightness monitoring device.

FIG. 3 shows a function diagram of an image brightness monitoring device 16. The input signals shown here are the image signal BA to be displayed and also the vertical synchronization signal VSYNC, and the output signal shown is an error signal FS. The image signal BA is managed separately for the three colors in which it exists, in this case red, green, and blue. Either a brightness value read from a table LUTR, LUTG, LUTB with respect to the corresponding color component is used, or the respective brightness value of the image signal BA is used directly. A bypass block BYP specifies it, the corresponding brightness values LR, LG, LB are then multiplied by the coefficients CR, CG, CB. Since the brightness for the different colors are perceived differently by the human user, it makes sense to give different weightings to the brightness of the different color components. The weighted brightness values LR×CR, LG×CG and LB×CB are summed over a specific time period, preferably over one full image. The vertical synchronization signal VSYNC is used to transfer the sum Σ to the next stage and to begin summing again from zero. In this case, summing always takes place over the time period of one full image. If the sum Σ is greater than a specified limit value THR, an error signal FS is output.

In other words, the disclosure relates to transparency monitoring to avoid dazzling in the head-up display at the end of the image processing chain. In order to implement in the head-up display an avoidance of glare for the purposes of functional safety, monitoring of the image transparency, that is to say of the brightness of the image BA to be represented, is required. Frequently, such transparency monitoring is implemented on a chip on the transmission path before the display element 11. It is still possible for malfunctions that result in the driver being dazzled to occur at the interface, which is used for the aforementioned purpose, to the display controller, for example the driver 12, or even in the display controller itself. For this reason, the transparency monitoring is arranged according to the disclosure as close to the end of the transmission chain as possible. Monitoring the image actually displayed by the display element 11 per camera is very complex, and to implement the transparency monitoring, that is to say the monitoring of the image brightness, in the display controller, a driver 12 is arranged on the display glass or the substrate 115. The transparency monitoring is arranged as close to the end of the processing chain of the display controller as possible so as to cover as many potential error sources as possible. In one embodiment, an image brightness monitoring device 16 is arranged downstream of the driver 12, that is to say between said driver and the display unit 11. Errors at the interface between the image control unit 40, for example a graphics chip, and the driver 12, for example a display controller, may be monitored and detected according to the disclosure.

What is claimed is:

1. A head-up display with a display apparatus comprising:
a picture generating unit comprising a display element for displaying an image and a driver for the display element;
an optical unit for projecting the image onto a projection surface; and an image control unit for controlling the display element via the driver, wherein the picture generating unit further comprises an image brightness monitoring device, which has an image signal input connected to an image signal output of the image control unit and has a signal output connected to a signal input of the display element, wherein the display apparatus comprises a plurality of electronic components, wherein at least one of the plurality of electronic components is the driver, wherein at least one of the plurality of electronic components is the image brightness monitoring device, wherein the plurality of electronic components are arranged on a substrate of the display element adjacent to an active surface, wherein the image brightness monitoring device is configured to sum the brightness of image points which have been transmitted thereto via an input signal, for an image to be represented within a time period and, if a limit value is exceeded within the time period, to reduce the brightness of the image points, wherein the image brightness monitoring device is configured to reduce the image points of a first group of image points in terms of their brightness more strongly than the image points of a second group, and wherein the image points of the second group contain safety-critical information with regard to driving safety.

2. The head-up display as claimed in claim 1, wherein the image brightness monitoring device is arranged between the image control unit and the driver.

3. The head-up display as claimed in claim 1, wherein the image brightness monitoring device is arranged between the driver and the display element.

4. The head-up display as claimed in claim 1, wherein the image brightness monitoring device and the driver are implemented in one component.

5. The head-up display as claimed in claim 1, wherein the image brightness monitoring device has an error signal output connected to an error signal input of the image control unit.

\* \* \* \* \*